(12) United States Patent
Truscott

(10) Patent No.: US 9,216,534 B2
(45) Date of Patent: Dec. 22, 2015

(54) COEXTRUSION FEEDBLOCK AND COEXTRUSION PROFILING INSERT ASSEMBLY

(71) Applicant: Nordson Extrusion Dies Industries, LLC, Chippewa Falls, WI (US)

(72) Inventor: Michael K. Truscott, Chippewa Falls, WI (US)

(73) Assignee: NORDSON CORPORATION, Westlake, OH (US)

( * ) Notice: Subject to any disclaimer, the term of this patent is extended or adjusted under 35 U.S.C. 154(b) by 35 days.

(21) Appl. No.: 14/052,040

(22) Filed: Oct. 11, 2013

(65) Prior Publication Data

US 2015/0104535 A1 Apr. 16, 2015

(51) Int. Cl.
*B29C 47/06* (2006.01)
*B29C 47/14* (2006.01)
*B29C 47/12* (2006.01)
(Continued)

(52) U.S. Cl.
CPC ............ *B29C 47/128* (2013.01); *B29C 47/065* (2013.01); *B29C 47/0816* (2013.01); *B29C 47/0837* (2013.01); *B29C 47/145* (2013.01); *B29C 47/16* (2013.01); *B29C 47/92* (2013.01); B29C 47/0019 (2013.01); B29C 47/0021 (2013.01); B29C 47/56 (2013.01); B29C 2947/926 (2013.01); B29C 2947/92133 (2013.01); B29C 2947/92152 (2013.01); B29C 2947/92409 (2013.01); B29C 2947/92447 (2013.01); B29C 2947/92628 (2013.01); B29C 2947/92647 (2013.01); B29C 2947/92904 (2013.01); B29C 2947/92942 (2013.01); B29L 2009/00 (2013.01)

(58) Field of Classification Search
CPC ............ B29C 47/0019; B29C 47/0021; B29C 47/065; B29C 47/0816; B29C 47/0837; B29C 47/145; B29C 2947/926; B29C 2947/92647; B29C 2947/92904
See application file for complete search history.

(56) References Cited

U.S. PATENT DOCUMENTS 3,195,183 A 7/1965 Phillips
3,680,997 A 8/1972 Dukert et al.
(Continued)

FOREIGN PATENT DOCUMENTS

CN 103857517 A 11/1985
CN 104552883 A 4/2015
(Continued)

OTHER PUBLICATIONS

EDI Advances, Special K Issue, No. 20, retrieved from the Internet [http://www.extrusiondies.com/newsletter.phtml] on Jul. 10, 2015, (2010) 6 pages, Extrusion Dies Industries, LLC, Chippewa Falls, Wisconsin.
(Continued)

*Primary Examiner* — Alison Hindenlang
*Assistant Examiner* — Joseph Leyson
(74) *Attorney, Agent, or Firm* — Baker & Hostetler LLP

(57) ABSTRACT

The invention provides a coextrusion feedblock. The feedblock has a flow adjuster comprising a plurality of independently rotatable adjustment segments. Actuators are coupled with respective adjustment segments of the flow adjuster, such that the segments can be rotated by operating the actuators. The invention also provides a coextrusion profiling insert assembly for mounting removably in a coextrusion feedblock.

20 Claims, 11 Drawing Sheets

(51) Int. Cl.
*B29C 47/08* (2006.01)
*B29C 47/16* (2006.01)
*B29C 47/92* (2006.01)
B29L 9/00 (2006.01)
B29C 47/00 (2006.01)
B29C 47/56 (2006.01)

(56) References Cited

U.S. PATENT DOCUMENTS

| | | | | |
|---|---|---|---|---|
| 3,743,143 | A | * | 7/1973 | Barney et al. ............ 222/145.7 |
| 3,761,211 | A | * | 9/1973 | Parkinson ................ 425/133.5 |
| 3,792,945 | A | | 2/1974 | Randall |
| 3,877,857 | A | | 4/1975 | Melead |
| 4,152,387 | A | | 5/1979 | Cloeren |
| 4,197,069 | A | * | 4/1980 | Cloeren ................... 425/131.1 |
| 4,344,907 | A | | 8/1982 | Herrington |
| 4,439,125 | A | | 3/1984 | Dieckmann et al. |
| 4,533,308 | A | | 8/1985 | Cloeren |
| 4,600,550 | A | * | 7/1986 | Cloren ................... 264/173.13 |
| 4,695,236 | A | | 9/1987 | Predohl et al. |
| 4,780,258 | A | | 10/1988 | Cloeren |
| 4,784,815 | A | | 11/1988 | Cloeren et al. |
| 4,789,513 | A | | 12/1988 | Cloeren |
| 4,839,131 | A | * | 6/1989 | Cloeren ................... 264/173.12 |
| 5,066,435 | A | | 11/1991 | Lorenz et al. |
| 5,066,443 | A | | 11/1991 | Cloeren |
| 5,147,195 | A | | 9/1992 | Cloeren |
| 5,375,990 | A | | 12/1994 | Krupa et al. |
| 5,971,736 | A | | 10/1999 | Velluire |
| 6,017,207 | A | | 1/2000 | Druschel |
| 6,287,105 | B1 | | 9/2001 | Druschel et al. |
| 6,626,206 | B1 | | 9/2003 | Ulcei et al. |
| 7,384,254 | B2 | * | 6/2008 | Rubhausen et al. ....... 425/133.5 |
| 7,641,462 | B2 | | 1/2010 | Ito et al. |
| 7,845,927 | B2 | | 12/2010 | Druschel et al. |
| 2008/0138598 | A1 | * | 6/2008 | Michel et al. ................ 428/221 |
| 2009/0194901 | A1 | | 8/2009 | Nakamura |
| 2013/0234359 | A1 | | 9/2013 | Ulcej et al. |

FOREIGN PATENT DOCUMENTS

| | | |
|---|---|---|
| DE | 19757827 A1 | 6/1999 |
| DE | 202004011742 U1 | 10/2004 |
| EP | 0161812 A2 | 11/1985 |
| EP | 0781641 A2 | 7/1997 |
| JP | S5497663 A | 8/1979 |
| JP | H02286217 A | 11/1990 |
| JP | H05345347 A | 12/1993 |

OTHER PUBLICATIONS

EDI Advances, Issue No. 21, (2011) 6 pages, Extrusion Dies Industries, LLC, Chippewa Falls, Wisconsin.

Nordson Extrusion Dies Industries, "Adjustable Feedblock Boosts Productivity in Coextrusion by Fine-Tuning Layer Thickness Without Need for Flow Inserts", retrieved from the Internet [http://www.extrusiondies.com/news_literature.phtml] on Jul. 10, 2015 (Oct. 27, 2010) 1 page, Extrusion Dies Industries, LLC, Chippewa Falls, Wisconsin.

* cited by examiner

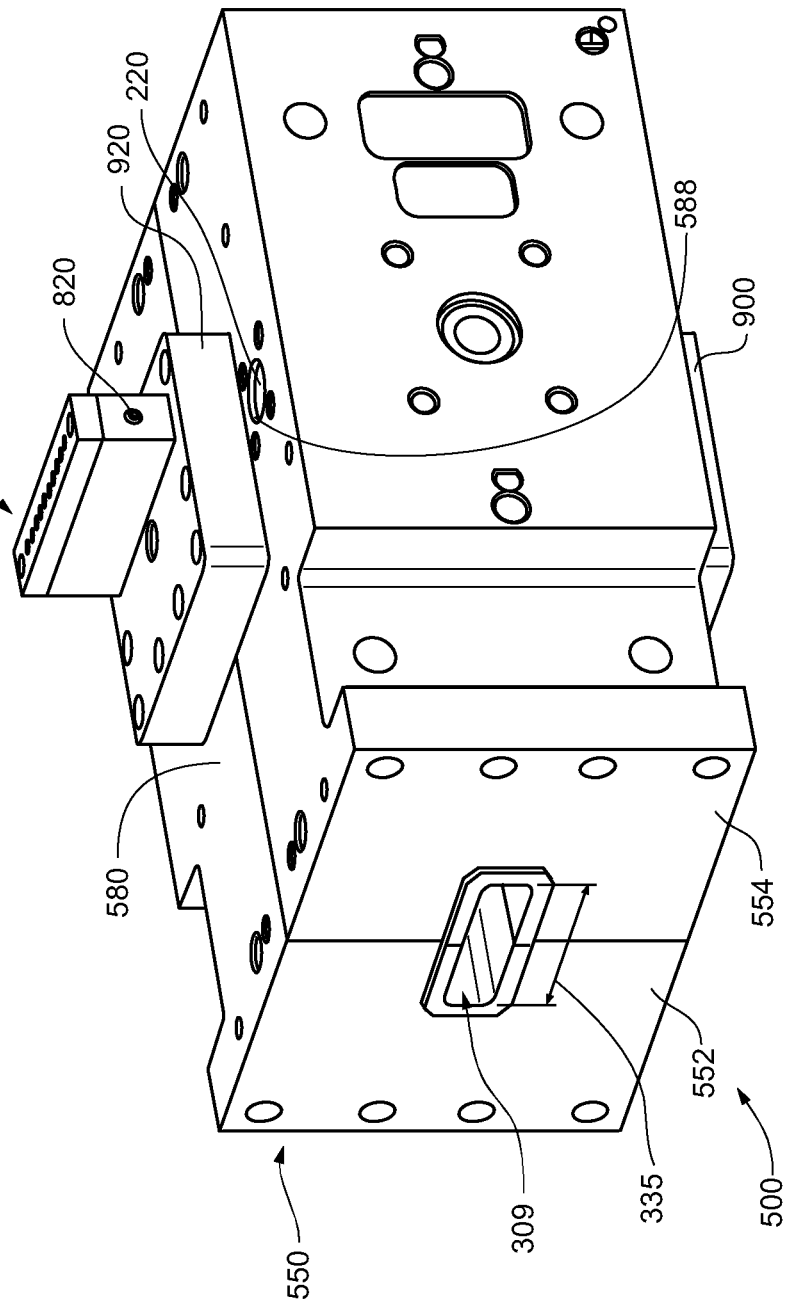

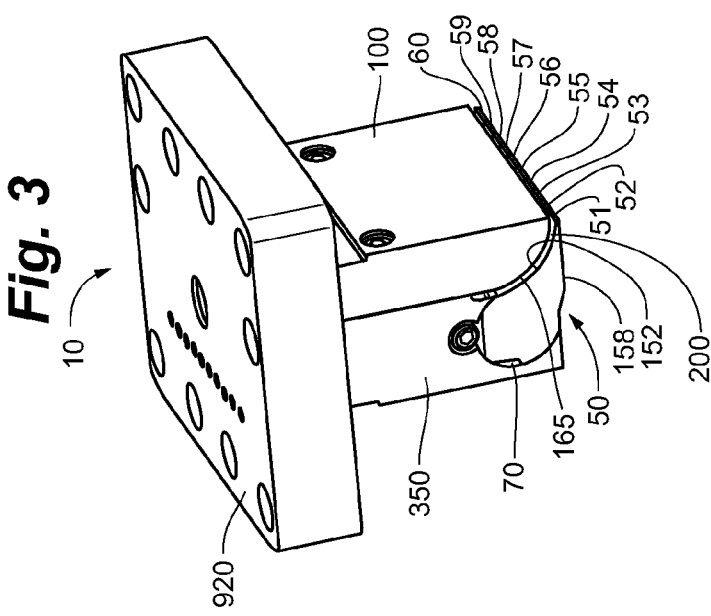
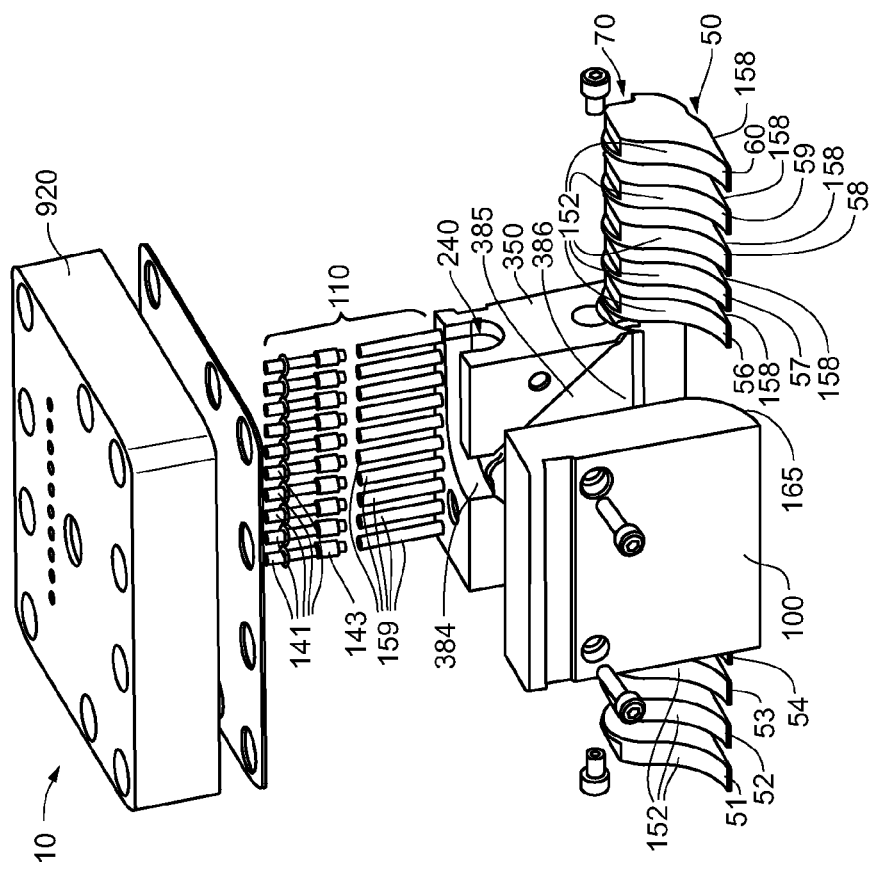

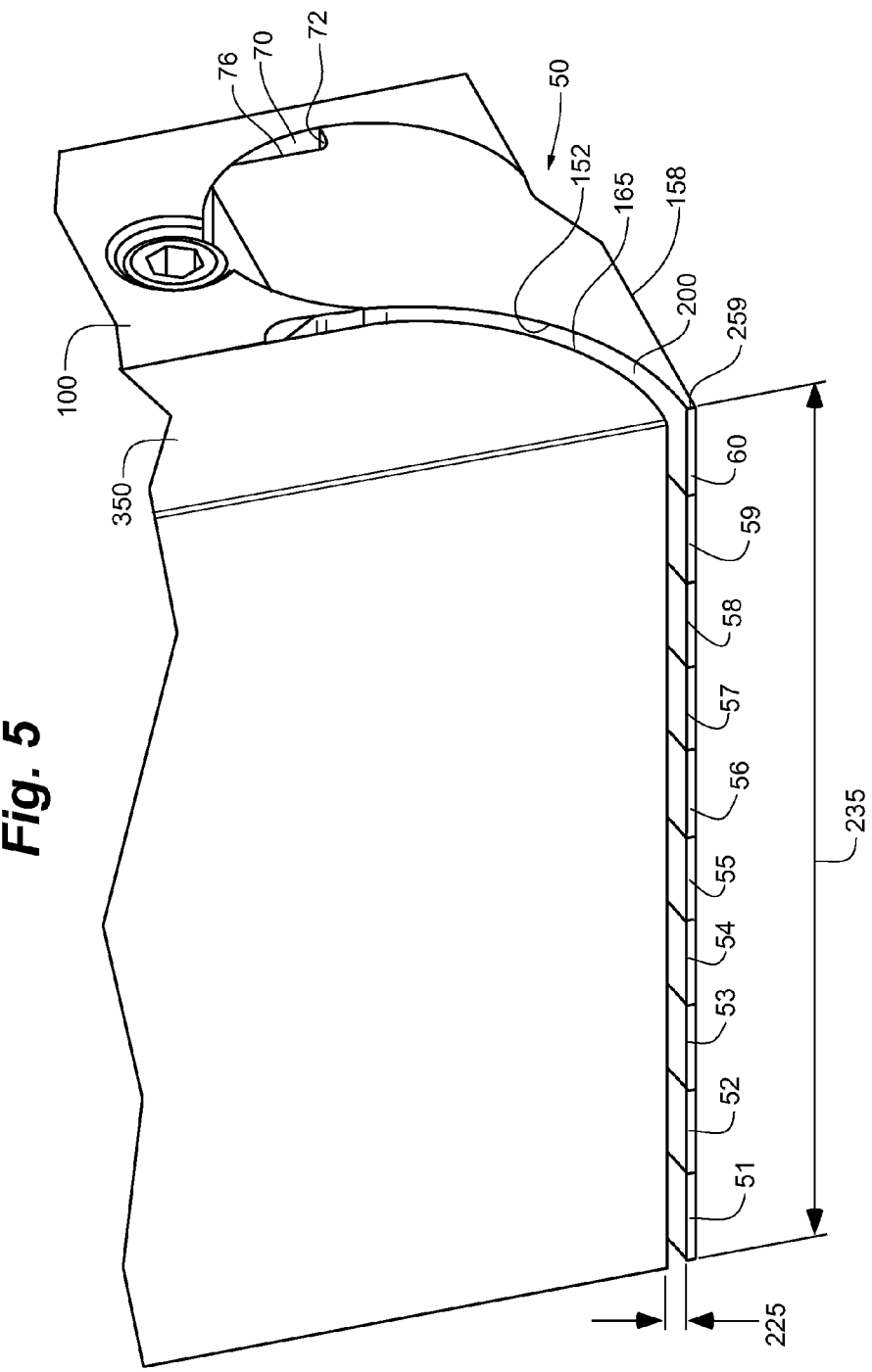

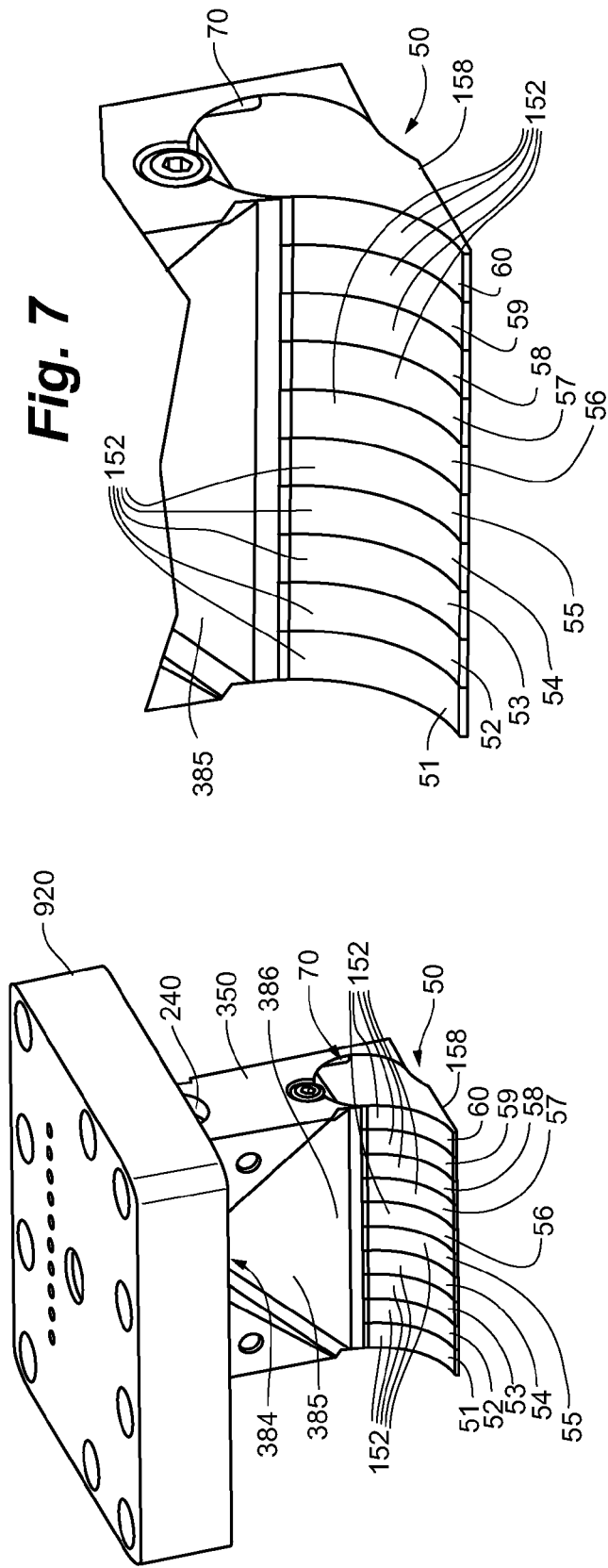

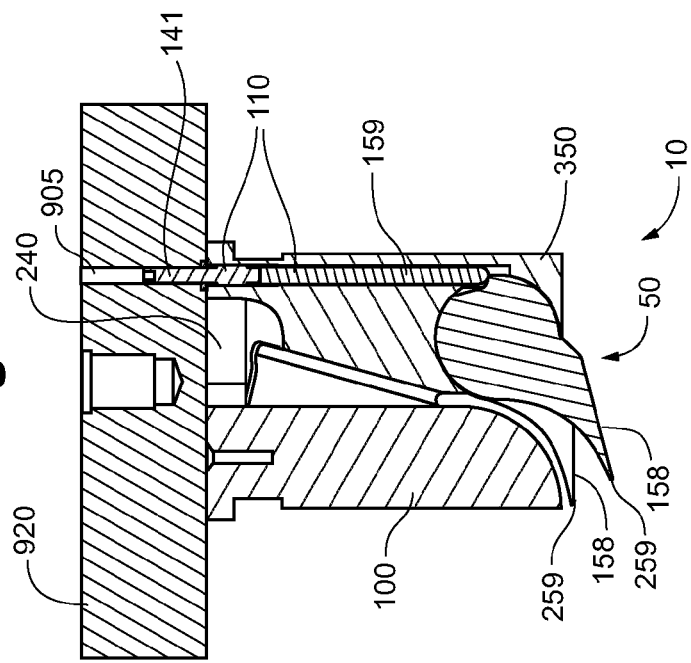
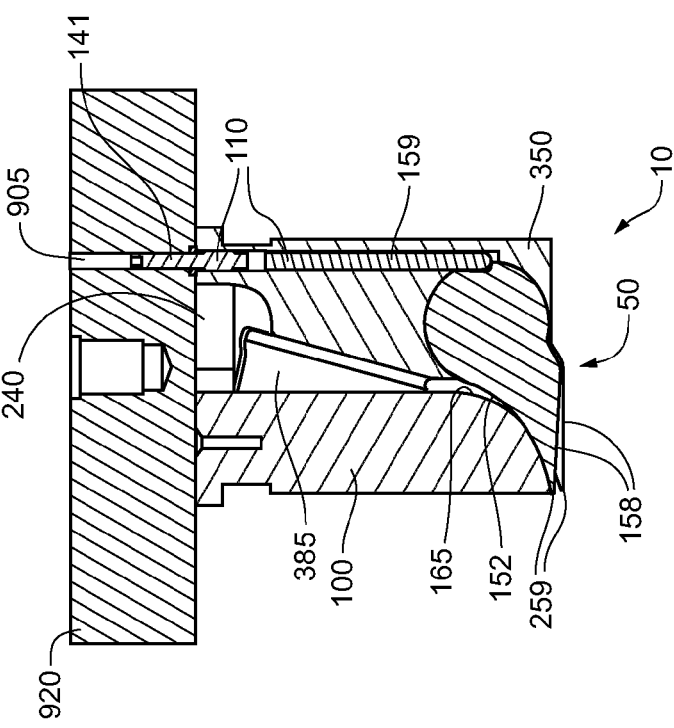

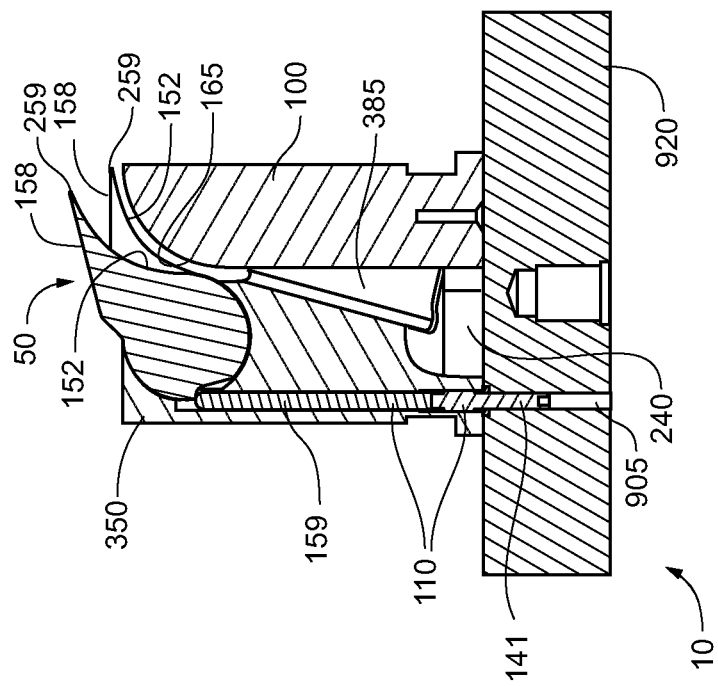
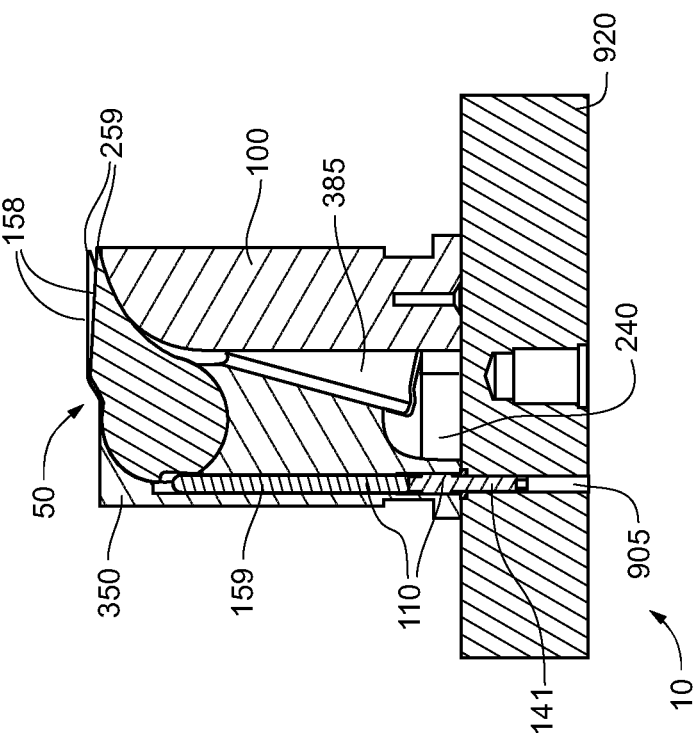

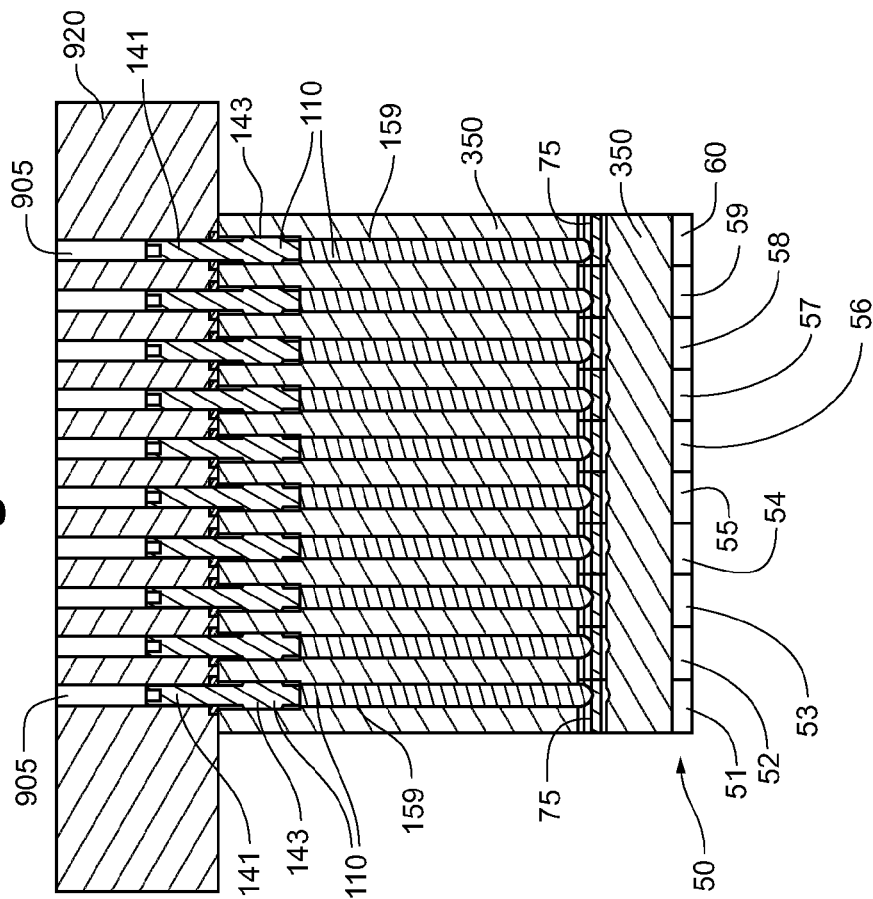

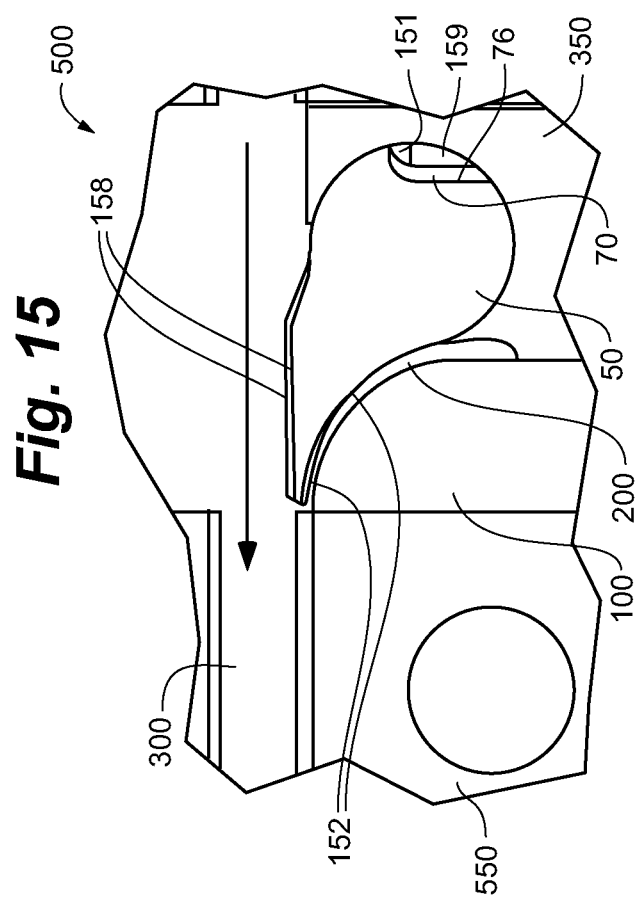
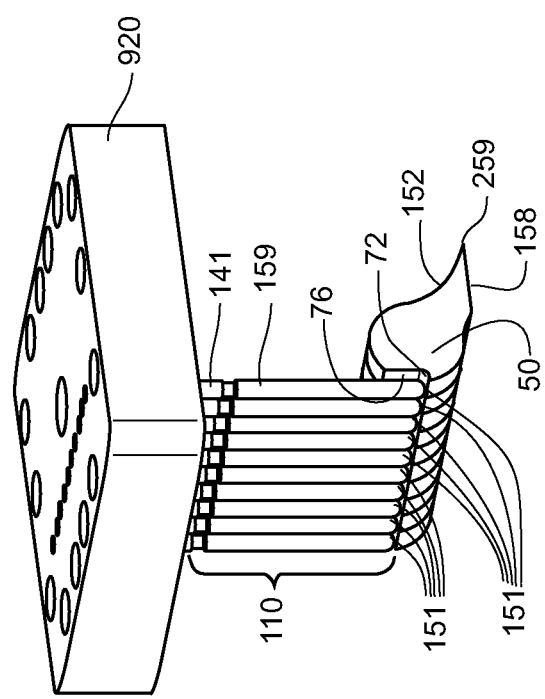

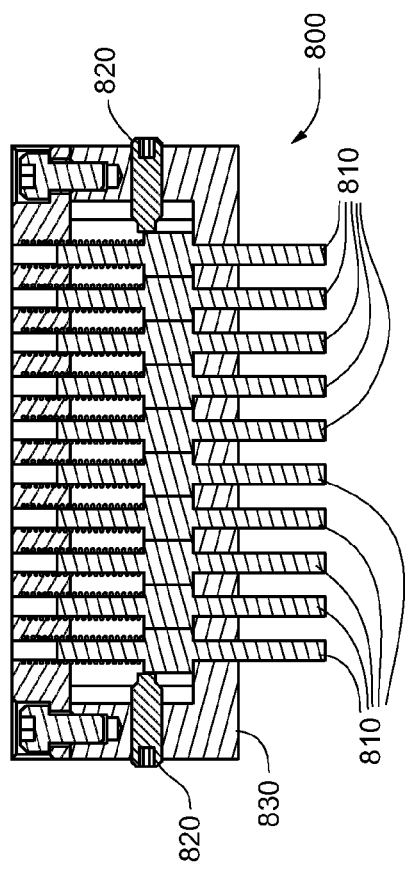
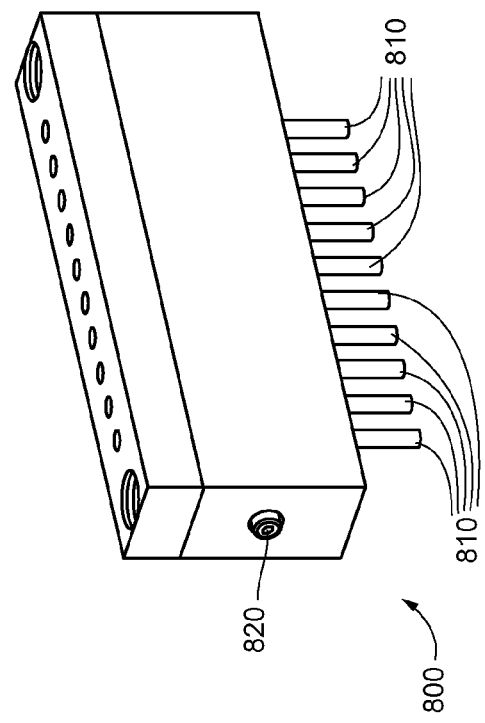

COEXTRUSION FEEDBLOCK AND COEXTRUSION PROFILING INSERT ASSEMBLY

TECHNICAL FIELD

The invention relates generally to extrusion devices. More specifically, the invention relates to coextrusion feedblocks.

BACKGROUND

Coextrusion feedblocks are used for bringing together molten streams of thermoplastic materials from multiple extruders. The individual streams from different extruders are brought together in the coextrusion feedblock to form particular layer arrangements. The resulting multi-layer extrudate flow is then delivered to a subsequent extrusion die, or another downstream tool, to produce the desired composite coextrusion structure.

In the process of bringing together multiple streams of different plastic materials, the different materials commonly have different properties. For example, different plastics tend to exhibit different viscosities. The variations in viscosity or other properties can adversely impact the layer uniformity of the resulting multi-layer coextrusion structure. To compensate for this, it may be desirable to adjust the profile of one or more of the conduits through which the different streams pass. In the past, this has been attempted by using a variety of profiling components.

Existing profiling components have not been ideal for all applications. For example, some profiling components require off-line tuning, meaning extrusion must be stopped and the component removed and profiled by machining and polishing. Further, certain adjustable profiling components are rigidly attached to control shafts, and the rigid attachment can cause flow instability. Still further, some known profiling systems offer less adjustability, and hence less control over profiling, than would be ideal for certain applications.

It would be desirable to provide coextrusion feedblocks and coextrusion profiling insert assemblies that address these and other problems associated with adjustable coextrusion feedblocks.

SUMMARY

In one embodiment, the invention provides a coextrusion feedblock having a housing, a central conduit, a coextrusion conduit, a wedge-shaped flow adjuster, and a plurality of actuators. The coextrusion conduit has a gap height, a width, and a length. The wedge-shaped flow adjuster comprises a plurality of adjustment segments positioned side-by-side along the width of the coextrusion conduit. Each of the adjustment segments is independently rotatable. The actuators are operably coupled with respective adjustment segments of the wedge-shaped flow adjuster. Each actuator is moveable between first and second configurations. The first configuration involves the actuator engaging the respective adjustment segment of the wedge-shaped flow adjuster to limit rotation of the adjustment segment. The second configuration involves the actuator being disengaged such that the respective adjustment segment of the wedge-shaped flow adjuster is allowed to rotate in response to mass flow variations of extrudates flowing through the central conduit and the coextrusion conduit.

In another embodiment, the invention provides a coextrusion profiling insert assembly configured to be mounted in a mount opening of a coextrusion feedblock having a housing, a central conduit, and a coextrusion conduit. The insert assembly has a wedge-shaped flow adjuster and a plurality of actuators. The wedge-shaped flow adjuster comprises a plurality of adjustment segments configured to be positioned side-by-side along a width of the coextrusion conduit. Each of the adjustment segments is independently rotatable when the insert assembly is operably mounted in the mount opening of the coextrusion feedblock. The actuators are configured to be operably coupled with respective adjustment segments of the wedge-shaped flow adjuster such that each actuator is moveable between first and second configurations. The first configuration involves the actuator engaging the respective adjustment segment of the wedge-shaped flow adjuster to limit rotation of the adjustment segment. The second configuration involves the actuator being disengaged such that the respective adjustment segment of the wedge-shaped flow adjuster is allowed to pivot in response to mass flow variations of extrudates flowing through the central conduit and the coextrusion conduit.

BRIEF DESCRIPTION OF THE DRAWINGS

The drawings are illustrative of particular embodiments of the invention and therefore do not limit the scope of the invention. The drawings are not necessarily to scale and are intended for use in conjunction with the explanations provided in the following detailed description. Embodiments of the invention will hereinafter be described in connection with the appended drawings, wherein like numerals denote like elements.

FIG. 2 is a perspective view of the coextrusion feedblock of FIG. 1.

FIG. 3 is a perspective view of a coextrusion profiling insert assembly in accordance with an embodiment of the invention.

FIG. 4 is an exploded perspective view of the coextrusion profiling insert assembly of FIG. 3.

FIG. 5 is a partially broken-away perspective detail view of the coextrusion profiling insert assembly of FIG. 3.

FIG. 6 is a perspective view of a flow block, a wedge-shaped flow adjuster, and a seal plate of the coextrusion profiling insert assembly of FIG. 3.

FIG. 7 is a partially broken-away perspective detail view of the wedge-shaped flow adjuster of FIG. 6.

FIG. 9 is a cross-sectional view of the coextrusion profiling insert assembly of FIG. 3, with the assembly in a downward-facing position and the actuator shown in a disengaged configuration.

FIG. 10 is another cross-sectional view of the coextrusion profiling insert assembly of FIG. 3, with the assembly in a downward-facing position and the actuator shown in a disengaged configuration.

FIG. 11 is yet another cross-sectional view of the coextrusion profiling insert assembly of FIG. 3, with the assembly in an upward-facing position and the actuator shown in a disengaged configuration.

FIG. 12 is still another cross-sectional view of the coextrusion profiling insert assembly of FIG. 3, with the assembly in an upward-facing position and the actuator shown in a disengaged configuration.

FIG. 13 is yet another cross-sectional view of the coextrusion profiling insert assembly of FIG. 3.

FIG. 14 is a perspective detail view of a wedge-shaped flow adjuster, a plurality of actuators, and a seal plate of the coextrusion profiling insert assembly of FIG. 3.

FIG. 15 is a broken-away cross-sectional detail view of the coextrusion feedblock of FIG. 1.

FIG. 16 is a perspective view of a device for measuring the placement of actuators inside a feedblock in accordance with an embodiment of the invention.

FIG. 17 is a cross-sectional view of the measurement device of FIG. 16.

DETAILED DESCRIPTION

The following detailed description is exemplary in nature and is not intended to limit the scope, applicability, or configuration of the invention in any way. The description provides practical illustrations for implementing certain preferred embodiments of the invention. Examples of constructions, materials, dimensions, and manufacturing processes are provided for selected elements; all other elements employ that which is known to those of ordinary skill in the field of the invention. Those skilled in the present art will recognize that many of the given examples have a variety of suitable alternatives.

Figure 1:
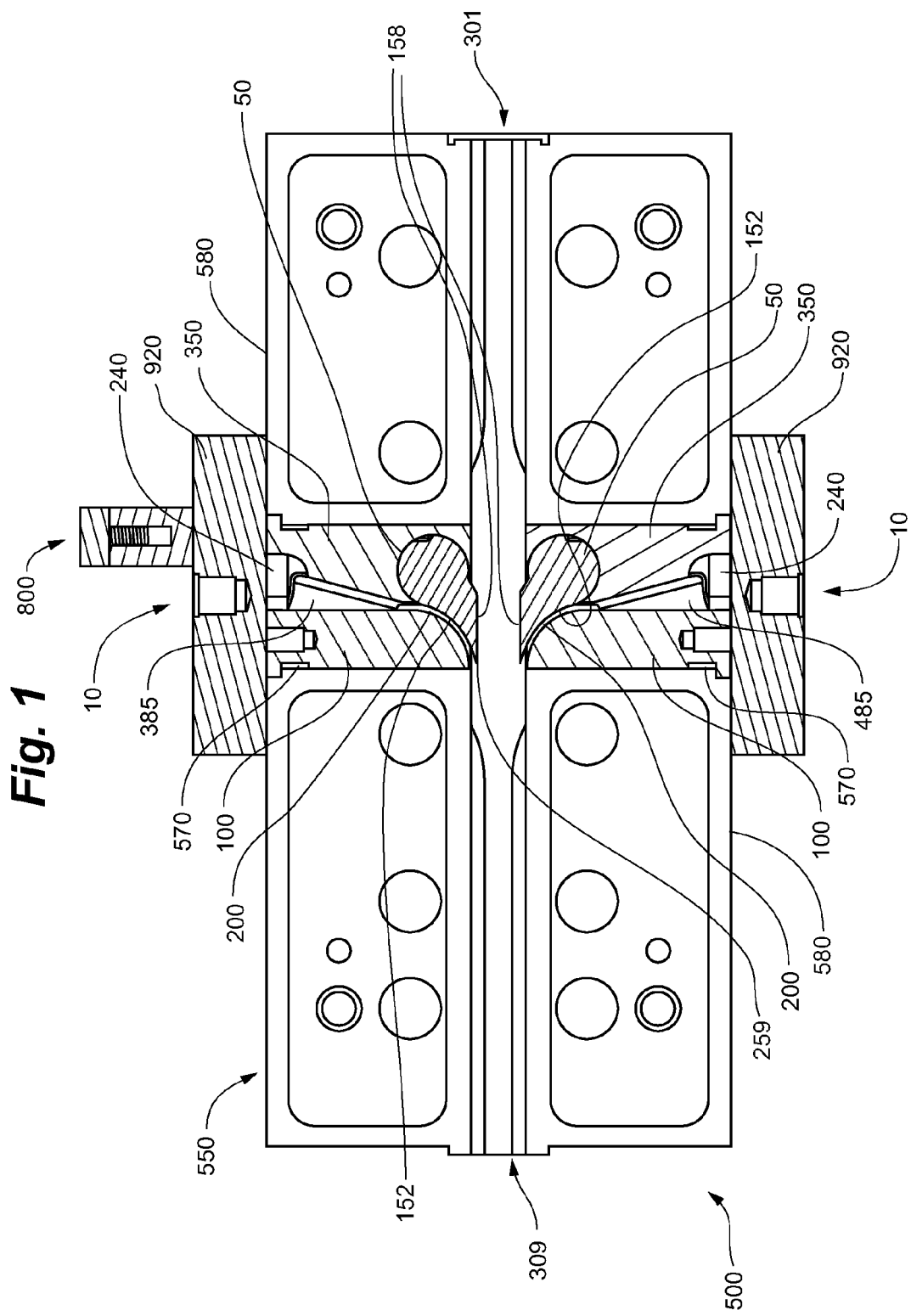
FIG. 1 is a cross-sectional view of a coextrusion feedblock in accordance with an embodiment of the present invention.

One embodiment of the invention provides a coextrusion feedblock 500. Reference is made to FIGS. 1 and 2. In the present embodiment, the feedblock 500 has a housing 550, a central conduit 300, a coextrusion conduit 200, a wedge-shaped flow adjuster 50, and a plurality of actuators 110.

The housing 550 of the illustrated feedblock 500 comprises first 552 and second 554 blocks joined together. In FIGS. 1 and 2, the central conduit 300 extends along a path located at an interface of these two blocks 552, 554. Thus, the two blocks 552, 554 collectively surround, and are each exposed to, the central conduit 300. In other embodiments, a single block can define both halves of the feedblock.

As shown in FIG. 1, the housing 550 has an inlet 301 to which an extruder can be operably coupled to feed a supply of polymer into the central conduit 300. In the illustrated embodiment, the housing 550 also has inlets 588 to which additional extruders can be operably coupled to feed supplies of polymer into the coextrusion conduits 200. It is to be appreciated that the inlets 301, 588 can be provided at various different locations on the feedblock. Moreover, a single inlet on the feedblock can alternatively be provided to supply polymer to both of the coextrusion conduits.

The configuration of the central conduit 300 can be varied to suit many different applications. In FIGS. 1 and 2, a single central conduit 300 extends along a straight path located in the middle of the feedblock 500. This, however, is not required. For example, the central conduit need not be located at the middle of the feedblock. Instead, it may be closer to the top or bottom of the feedblock. The central conduit may be curved or angled, although it will generally be desirable to minimize the flow resistance in the conduit. Moreover, in some cases, layers from one or more coextrusion conduits 200 are applied to one side, but not both sides, of the core layer created by the central conduit. In such cases, one or more coextrusion conduits are provided on one side of the central conduit 300, but not on the other side.

In FIGS. 1 and 2, the coextrusion feedblock 500 has a single central conduit 300 and two coextrusion conduits 200. A feedblock of this nature will commonly be used to produce a 3-layer coextrusion structure. Skilled artisans will appreciate, however, that a single or double-layer coextrusion structure can be produced with such a feedblock 500. This can be done, for example, by not using and closing one or both of the coextrusion conduits 200. More generally, the number and arrangement of coextrusion conduits 200 can be varied to accommodate many different applications. The feedblock, for example, can alternatively have a single coextrusion conduit. As another example, when a 5-layer coextrusion structure is desired, the feedblock will typically have four coextrusion conduits. Many other variants of this nature will be readily apparent to skilled artisans given the present teaching as a guide.

The following disclosure describes various features of a coextrusion conduit 200. In cases where the feedblock 500 has multiple coextrusion conduits 200, the features discussed below for a coextrusion conduit 200 can optionally be present in each coextrusion conduit. The same is true for the descriptions herein of other components and features that are, or optionally can be, present in pairs or other multiples. The following description of a wedge-shaped flow adjuster 50, for example, can optionally apply to each such flow adjuster in cases where there are multiple wedge-shaped flow adjusters.

The coextrusion conduit 200 has a gap height, a width, and a length. FIG. 5 identifies the gap height by reference number 225; the width of the coextrusion conduit is identified by reference number 235. In the illustrated embodiment, the width 235 of each coextrusion conduit 200 is equal to the width 335 of the central conduit 300, at least where the coextrusion conduits intersect the central conduit. While this will commonly be preferred, it is not required.

The illustrated feedblock 500 is configured such that the gap height 225 is adjustable, and can be set to be different at different locations along the gap width 235. Thus, the coextrusion conduit 200 is locally adjustable along its width 235.

FIGS. 1 and 2 show part of the length of the coextrusion conduit 200. Extrudate is fed into the feedblock 500 through an input 588 (see FIG. 2). A first section 220 of the coextrusion conduit 200 extends through the housing 550 of the feedblock 500 (see FIG. 2), and a second section 240 extends through a coextrusion profiling insert assembly 10 mounted removably in the feedblock (see FIG. 1). A downstream extent of the second section 240 of each coextrusion conduit 200 extends alongside the wedge-shaped flow adjuster 50. Thus, the flow adjuster 50 is exposed to the coextrusion conduit 200. In the illustrated embodiment, the two coextrusion conduits 200 change direction and converge toward each other, and toward the central conduit 300, within the coextrusion profiling insert assembly 10. Each coextrusion conduit, however, can be designed to follow different paths through the feedblock, depending on the desired or existing line layout.

In FIG. 1, each coextrusion conduit 200 opens into the central conduit 300, such that the extrudate flow in each coextrusion conduit merges with the extrudate flow in the central conduit, thus producing a multi-layer extrudate flow. The layer delivered by the central conduit is referred to as the core layer. One or more layers from the coextrusion conduit(s) are layered onto the core layer. The resulting multi-layer extrudate flow moves along the remainder of the central conduit 300 until reaching the outlet 309. From the outlet 309, the multi-layer extrudate flow may be delivered to an extrusion die or another downstream tool, such as a layer multiplier or another feedblock.

As shown in FIGS. 3 and 4, the wedge-shaped flow adjuster 50 comprises a plurality of adjustment segments 51-60, which preferably are positioned side-by-side along the width 235 of the coextrusion conduit 200. The adjustment segments 51-60 are independently rotatable. As a result, the wedge-shaped flow adjuster 50 is adjustable to profile the coextrusion conduit 200 such that the gap height 225 is different adjacent to different adjustment segments 51-60. Thus, the flow adjuster 50 is adjustable to provide local profiling of the coextrusion conduit 200 over its width 235.

As shown in FIGS. 3-7 and 9-14, the adjustment segments 51-60 of the wedge-shaped flow adjuster 50 are formed by a series of discrete, individually rotatable bodies. In the embodiment illustrated, these bodies collectively span the width 235 of the coextrusion conduit 200. The illustrated flow adjuster 50 has ten adjustment segments 51-60. The number of adjustment segments, however, can be varied to accommodate the requirements of different applications.

Each adjustment segment 51-60 of the illustrated flow adjuster 50 has a generally wedge-shaped configuration. In the illustrated embodiment, each adjustment segment 51-60 has a plate-like configuration with a cylindrical base region from which projects a wedge region that narrows with increasing distance from the cylindrical base region until reaching a tip 259, where the flows of extrudate from the central conduit 300 and the respective coextrusion conduit 200 intersect. This can be appreciated by referring to FIGS. 1 and 4.

As shown in FIGS. 1, 3-12, and 14-15, each adjustment segment of the wedge-shaped flow adjuster has first and second flow-contacting surfaces. The first flow-contacting surface 158 is exposed to the central conduit 300, and the second flow-contacting surface 152 is exposed to the coextrusion conduit 200. As a result, each adjustment segment 51-60 is rotatable to simultaneously change: i) the gap height 225 of the coextrusion conduit 200, and ii) a height of the central conduit 300.

The second flow-contacting surface 152 of each adjustment segment 51-60 preferably has a concave configuration. In the illustrated embodiment, the feedblock 500 has a viscosity block 100 with a convex flow-contacting surface 165 that is exposed to the coextrusion conduit 200 and confronts the second flow-contacting surface 152 of the flow adjuster 50. The viscosity block 100 is described in more detail below.

Figure 8:
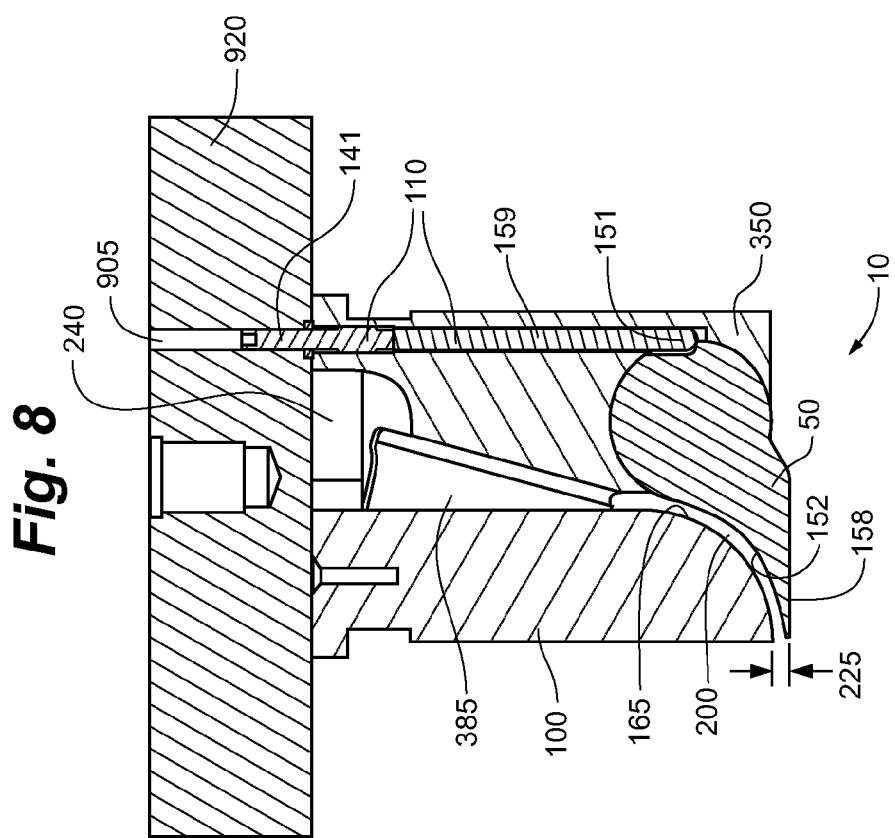
FIG. 8 is a cross-sectional view of the coextrusion profiling insert assembly of FIG. 3, with the assembly in a downward-facing position and the actuator shown in an engaged configuration.

As shown in FIGS. 8-14, the adjustment segments 51-60 of the flow adjuster 50 are operably coupled with respective actuators 110. Each actuator 110 is moveable between first and second configurations. As shown in FIG. 8, each actuator 110 when in the first configuration engages the respective adjustment segment 51-60 of the flow adjuster 50 to limit rotation of that adjustment segment. As shown in FIGS. 9-12, each actuator 110 when in the second configuration is disengaged such that the respective adjustment segment 51-60 of the flow adjuster 50 is allowed to rotate in response to mass flow variations of extrudates flowing through the central conduit 300 and the coextrusion conduit 200.

When an actuator 100 is in the second configuration, it preferably does not limit the range of rotational motion allowed for the respective adjustment segment 51-60 of the flow adjuster 50. Thus, in the illustrated embodiment, each adjustment segment 51-60 of the flow adjuster 50 has more freedom to rotate when the respective actuator 110 is in the second configuration than when it is in the first configuration.

As exemplified in FIG. 8, when the actuators 110 are in the first configuration, they preferably do not restrain the respective adjustment segments 51-60 against all rotation. To the contrary, the actuators 110 when in the first configuration preferably limit rotation of the respective adjustment segments 51-60 to a smaller range of rotational motion (compared to when the actuators are in the second configuration). Thus, in the illustrated embodiment, each adjustment segment 51-60 of the flow adjuster 50 has a larger permitted range of rotational motion when the respective actuator 110 is in the second configuration than when in the first configuration. This is best appreciated by comparing FIG. 8 (which shows an actuator in the first configuration) to FIGS. 9-12 (which show actuators in the second configuration).

In the illustrated embodiment, the first configuration involves the actuator 110 engaging the respective adjustment segment 51-60 of the flow adjuster 50 to limit rotation of the adjustment segment in a first direction without limiting rotation in an opposite, second direction. As shown in FIG. 8, rotation in the first direction involves widening the gap height 225 of the coextrusion channel 200, and rotation in the second direction involves narrowing the gap height of the coextrusion channel. Thus, when the actuator 110 is in the first configuration, it engages the respective adjustment segment 51-60 of the flow adjuster 50 so as to establish a maximum limit on how wide the gap height 225 of the coextrusion conduit 200 can be adjacent to that adjustment segment of the flow adjuster.

It is to be appreciated that when an actuator 110 is so engaged with the respective adjustment segment 51-60 of the flow adjuster 50, the actuator and the adjustment segment need not always be in contact with each other. Consider FIG. 8, where the actuator 110 is shown in the first configuration. If the insert assembly 10 were repositioned so as to be upwardly facing, and if the flow pressure in the central conduit 300 were increased enough (relative to the flow pressure in the coextrusion conduit) to rotate the adjustment segment slightly in the clockwise direction, then the actuator and the adjustment segment would not remain in contact. The actuator, however, would still be "engaged with" or "engaging" the adjustment segment, as those terms are used herein, because it would be limiting the rotation of the adjustment segment.

The present system provides a variety of benefits. For example, particularly good flow stability can be achieved by operating one or more of the adjustment segments 51-60 of the flow adjuster 50 in a free-floating mode. Moreover, if it is desirable to narrow one or more sections of a coextrusion conduit 200, then the appropriate actuator(s) 110 can be moved so as to rotate the respective adjustment segment(s) 51-60 of the flow adjuster 50 and thereby narrow the desired section(s) of the coextrusion conduit. For example, if the profile of the resulting multi-layer coextrusion structure shows heavy end flow of the skin layer, then the outermost actuators 110 can be moved so as to narrow the gap height 225 at the outer ends of the coextrusion conduit 200. More generally, if it is desirable to set a maximum limit on how wide the gap height 225 of the coextrusion conduit 200 can be adjacent to one or more adjustment segments 51-60 of the flow adjuster 50, then an operator can simply move the respective actuator(s) 110 accordingly.

As will be appreciated by skilled artisans, the feedblock 500 can be used in different orientations depending on the desired or existing line layout. In FIGS. 1 and 2, the feedblock 500 is oriented so that the two coextrusion profiling insert assemblies 10 are mounted respectively in downward-facing and upward-facing positions. FIGS. 8-10 show the downward-facing insert assembly 10, and FIGS. 11-12 show the upward-facing insert assembly 10.

In FIGS. 8-14, the actuators 110 are operably coupled with respective adjustment segments 51-60 of the wedge-shaped flow adjuster 50. A first of the actuators 110 can be moved axially to push a first 51 of the adjustment segments, thereby changing the gap height 225 adjacent to the first adjustment segment, and a second of the actuators can be moved axially to push a second 52 of the adjustment segments, thereby changing the gap height adjacent to the second adjustment segment. The situation is the same with respect to the other actuators 110 shown in FIGS. 8-14.

In the present embodiment, each adjustment segment 51-60 of the flow adjuster 50 has a cam surface 72, and each actuator 110 is configured to bear against the cam surface of the respective adjustment segment so as to rotate that adjustment segment. The rotation preferably narrows the gap height 225 of the coextrusion conduit 200 adjacent to the adjustment segment rotated. This is perhaps best appreciated by referring to FIGS. 1, 8-12, and 15. The adjustment segments 51-60 of the illustrated flow adjuster 50 are each rotatable about an axis that is substantially parallel to the width 235 of the coextrusion conduit 200.

In the illustrated embodiment, each actuator 100 comprises a rotatable controller 141 and a push rod 159. The controller 141 and push rod 150 of each actuator 110 are operably coupled with each other such that the controller can be rotated to move the push rod axially and thereby force the push rod to cam with the respective adjustment segment 51-60 of the flow adjuster 50. The resulting camming action between the engaged push rod and adjustment segment causes that adjustment segment to rotate so as to narrow the gap height 225 of the coextrusion conduit 200.

As is perhaps best appreciated by referring to FIGS. 4 and 8-13, each controller 141 can be a set screw or another exteriorly threaded body received in a corresponding interiorly threaded bore. In the illustrated embodiment, each controller 141 has a large-diameter region 143 (see FIG. 4) with the exterior threading (not shown), and the matching interior threading (not shown) is provided on the corresponding bore extending through the flow block 350. The illustrated push rods 159 are not externally threaded. Rather, they are mounted slidably in the bores extending through the flow block 350. Thus, in the illustrated embodiment, each push rod 159 is slidably positioned between a respective adjustment segment 51-60 of the flow adjuster 50 and a controller 141 located in the same bore as the push rod.

The illustrated controllers 141 are accessible from outside of the coextrusion feedblock 500. In FIGS. 1 and 2, two groups of controllers 141 are located respectively on opposed top and bottom walls of the feedblock 500. This, however, is not required.

In FIGS. 8-12, each adjustment segment 51-60 of the flow adjuster 50 rotates in response to rotating a controller 141 and thereby moving the respective push rod 159 axially so as to cam with the respective adjustment segment. While the illustrated controllers 141 are distinct bodies, which are separate from the push rods 159, this is not required. For example, the proximal end of each push rod can alternatively serve as the controller 141. Thus, while two-piece actuators 110 are illustrated, one-piece actuators can alternatively be used. Each actuator 110, for example, can consist of a single exteriorly threaded push rod having formed in its proximal end a groove shaped to receive a standard or Philips screwdriver tip, a hexagonal socket shaped to receive a hex key, or the like.

As best shown in FIGS. 5, 14, and 15, each adjustment segment 51-60 of the illustrated flow adjuster 50 has a recess 70 to which the cam surface 72 is exposed. In the illustrated embodiment, the recess 70 is located in the generally cylindrical base region of the adjustment segment. Thus, the cam surface 72 and the tip 259 are on generally opposed sides of the adjustment segment. With reference to FIGS. 5 and 14, the illustrated recess 70 is bounded collectively by the cam surface 72 and an elongated notch surface 76. The illustrated notch surface 76 forms an included angle of about 90 degrees with the cam surface 72, although this is by no means required.

In the embodiment illustrated, the feedblock 500 has a viscosity block 100 located on one side of the coextrusion conduit 200 so as to confront the wedge-shaped flow adjuster 50. The viscosity block 100 preferably has a convex flow-contacting surface 165 exposed to the coextrusion conduit 200. During operation, extrudate moving through such a coextrusion conduit 200 contacts the convex surface 165 of the viscosity block 100. In the illustrated embodiment, both the viscosity block 100 and the wedge-shaped flow adjuster 50 are exposed to the coextrusion conduit 200.

The flow-contacting surface 165 of the viscosity block 100 preferably is seamless over the width 235 of the coextrusion conduit 200. This can be accomplished, for example, when the viscosity block 100 comprises a single integral body, which defines the flow-contacting surface 165, spanning the width 235 of the coextrusion conduit 200. Reference is made to FIGS. 3-5.

In the illustrated embodiment, the wedge-shaped flow adjuster 50 and the viscosity block 100 are components of a coextrusion profiling insert assembly 10 mounted removably in the feedblock 500. This is shown in FIG. 1. The illustrated insert assembly 10 comprises two blocks 100, 350 mounted side-by-side within a mount opening 570 of the feedblock 500. In FIGS. 3, 4, 5, and 8-12, the first block 350 is a flow block that carries the wedge-shaped flow adjuster 50 and the actuators 110, while the second block 100 is the viscosity block. In the illustrated embodiment, the coextrusion conduit 200 extends between the viscosity block 100 and the flow block 350.

As shown in FIGS. 4 and 13, the flow block 350 has a plurality of bores in which respective actuators 110 are received for axial movement therein. The bores extend to respective adjustment segments 51-60 of the wedge-shaped flow adjuster 50, such that each actuator 110 can move through the bore in which it is mounted so as to contact, and cam with, the respective adjustment segment of the flow adjuster. Thus, the illustrated flow block 350: i) surrounds a section of the coextrusion conduit 200, ii) carries the wedge-shaped flow adjuster 50, and iii) has a plurality of bores in which respective actuators 110 are received.

Since the illustrated feedblock 500 has two coextrusion conduits 200, two coextrusion profiling insert assemblies 10 are mounted removably in the feedblock. The feedblock can have a smaller or larger number of coextrusion conduits, depending on the intended application. In many cases, the feedblock 500 will have a plurality of coextrusion conduits 200 and a plurality of coextrusion profiling insert assemblies 10 mounted removably in the feedblock, such that each insert assembly corresponds to, and is operable to adjust the profile of, a respective one of the coextrusion conduits. In the embodiment of FIGS. 1 and 2, during operation, the polymer stream of a given coextrusion conduit 200 flows through the respective coextrusion profiling insert assembly 10.

With continued reference to FIGS. 1 and 2, the two illustrated coextrusion profiling insert assemblies 10 are mounted removably on opposite sides of the feedblock 500. The illustrated feedblock 500 has two mount openings 570 in opposite sides of the housing 550. Each mount opening 570 extends from an outer wall 580 of the housing 550 to the central conduit 300. Thus, in FIG. 1, when the two insert assemblies 10 are mounted operably in the feedblock 500, their leading end regions confront each other across the central conduit 300. The leading end region of each insert assembly 10 preferably carries a wedge-shaped flow adjuster 50, such that the respective coextrusion conduit 200 extends between the flow adjuster and the viscosity block 100 of the insert assembly. Thus, each flow adjuster 50 preferably is exposed to the central conduit 300 when the coextrusion profile insert assemblies 10 are operatively mounted in the feedblock 500.

In FIGS. 1 and 2, each coextrusion profiling insert assembly 10 is mounted removably to the feedblock 500 via a seal plate 920 secured removably to the feedblock by bolts or other removable fasteners. This allows each insert assembly 10 to be readily and repeatedly mounted in, and subsequently removed from, the feedblock 500.

FIGS. 1 and 2 show the coextrusion feedblock 500 equipped with an optional measurement device 800 for determining the placement of the actuators 110. The measurement device 800 is illustrated in more detail in FIGS. 16 and 17. The device 800 has spring-loaded pins 810 that conform to the positions of the controllers 141 of the actuators 110. To determine the placement of the actuators 110, the face 830 of the measurement device 800 is placed flush against the seal plate 920 with the spring-loaded pins 810 extending into respective bores 905 in the seal plate 905 (see FIG. 13). In so doing, the two set screws 820 on opposite sides of the measurement device 800 have been loosened, so as to enable the springs to move the pins 810 axially until striking the respective actuators 110. The two set screws 820 on the measurement device 800 are then tightened, so as to freeze the spring-loaded pins 810 in place. By then removing the measurement device 800 from the feedblock 500, an operator can determine the placement of the actuators 110 inside the feedblock by measuring the projection distance of each pin 810. The present feedblock 500, however, is not required to have a measurement device, much less a device of the type illustrated.

In the embodiment described above, the invention provides a coextrusion feedblock having an advantageous system for independently controlling a plurality of rotatable adjustment segments of a flow controller. To accomplish the desired control of the flow controller, the illustrated feedblock is equipped with a removable coextrusion profiling insert assembly. In another embodiment, the invention provides the insert assembly itself, as will now be described. The insert assembly 10 of the present embodiment can be of the nature described above in connection with the feedblock embodiment. For example, the present insert assembly 10 can have any of the features described above in connection with the two insert assemblies 10 shown in the feedblock 500 of FIGS. 1 and 2.

Thus, the present coextrusion profiling insert assembly 10 is configured to be mounted in a mount opening 570 of a coextrusion feedblock 500 having a housing 550, a central conduit 300, and a coextrusion conduit 200. The insert assembly 10 can be configured to be removably mounted in, for example, a feedblock 500 of the nature described above with reference to FIGS. 1 and 2.

The insert assembly 10 has a wedge-shaped flow adjuster 50 and a plurality of actuators 110. Reference is made to FIGS. 4 and 8-14. The flow adjuster 50 comprises a plurality of adjustment segments 51-60 configured to be positioned side-by-side along a width 235 of the coextrusion conduit 200. Each of the adjustment segments 51-60 is independently rotatable when the insert assembly 10 is operably mounted in the mount opening 570 of the feedblock 200. Thus, the flow adjuster 50 is configured to profile the coextrusion conduit 200 such that the gap height 225 is different adjacent to different adjustment segments 51-60 of the flow adjuster.

In the present embodiment, the actuators 110 are configured to be operably coupled with respective adjustment segments 51-60 of the flow adjuster 50 such that each actuator is moveable between first and second configurations. As shown in FIG. 8, each actuator 110 when in the first configuration engages the respective adjustment segment 51-60 of the flow adjuster 50 to limit rotation of that adjustment segment. As shown in FIGS. 9-12, each actuator 110 when in the second configuration is disengaged such that the respective adjustment segment 51-60 of the flow adjuster 50 is allowed to rotate in response to mass flow variations of extrudates flowing through the central conduit 300 and the coextrusion conduit 200.

In the illustrated embodiment, each adjustment segment 51-60 of the flow adjuster 50 has more freedom to rotate when the respective actuator 110 is in the second configuration than when it is in the first configuration. The first configuration preferably involves the actuator 110 engaging the respective adjustment segment 51-60 of the flow adjuster 50 to limit rotation of the adjustment segment in a first direction without limiting rotation in an opposite, second direction. As noted above, rotation in the first direction involves widening the gap height 225 of the coextrusion channel 200, and rotation in the second direction involves narrowing the gap height of the coextrusion channel. Thus, the first configuration involves the actuator 110 engaging the respective adjustment segment 51-60 of the flow adjuster 50 so as to establish a maximum limit on how wide the gap height 225 of the coextrusion conduit 200 can be adjacent to that adjustment segment of the flow adjuster.

The illustrated insert assembly 10 is configured to be operably mounted in the mount opening 570 of the feedblock 500 such that each actuator 110 can be moved axially to rotate the respective adjustment segment 51-60 of the flow adjuster 50 and thereby narrow a gap height 225 of the coextrusion conduit 200. Thus, the actuators 110 are configured to be operably coupled with respective adjustment segments 51-60 of the flow adjuster 50 such that a first of the actuators 110 can be moved axially to push and rotate a first 51 of the adjustment segments, thereby narrowing a gap height 225 of the coextrusion conduit 200 adjacent to the first of the adjustment segments, and such that a second of the actuators can be moved axially to push and rotate a second 52 of the adjustment segments, thereby narrowing a gap height of the coextrusion conduit adjacent to the second of the adjustment segments. The situation is the same with respect to the other actuators 110 shown in FIGS. 8-14.

In the illustrated embodiment, each adjustment segment 51-60 has first 158 and second 152 flow-contacting surfaces. During use, the first flow-contacting surface 158 is exposed to a central conduit 300 of the feedblock 500, and the second flow-contacting surface 152 is exposed to the coextrusion conduit 200. Thus, the insert assembly 10 is configured to be operably mounted in the mount opening 550 of the feedblock 500 such that i) the first flow-contacting surface 158 of each adjustment segment 51-60 of the flow adjuster 50 is exposed to the central conduit 300, ii) the second flow-contacting surface 152 of each adjustment segment the flow adjuster is exposed to the coextrusion conduit 200, and iii) each adjustment segment of the flow adjuster is rotatable to simultaneously change a gap height of the coextrusion conduit and a height of the central conduit.

As is perhaps best shown in FIGS. 5 and 14, each adjustment segment 51-60 of the flow adjuster 50 has a cam surface 72, and each actuator 110 is configured to bear against the cam surface of the respective adjustment segment of the flow adjuster to rotate the adjustment segment such that a gap height 225 of the coextrusion conduit 200 is narrowed. In the embodiment illustrated, the cam surface 72 and the tip 259 are on generally-opposed sides of each adjustment segment 51-60, although this is not required.

Each adjustment segment 51-60 of the illustrated flow adjuster 50 has a generally cylindrical base region and a tip 159. The generally cylindrical base region has a recess 70 to which the cam surface 72 is exposed. In the embodiment illustrated, the first 158 and second 152 flow-contacting surfaces converge toward each other with increasing distance from the generally cylindrical base region until reaching the tip 259. It is to be appreciated, however, that other configurations can be used for the adjustment segments of the flow adjuster.

In the illustrated embodiment, each actuator 110 comprises a controller 141 and a push rod 159 configured to be operably coupled with each other such that the controller can be rotated to move the push rod axially and thereby cam with the respective adjustment segment 51-60 of the flow adjuster 50. The illustrated controllers 141 are discrete bodies, separate from the push rods 159. The controllers 141 are externally threaded, while the push rods 159 are not. In the illustrated embodiment, the controllers 141 are configured to be mounted within corresponding interiorly-threaded bores of the flow block 350, while the push rods 159 are configured to be slidably received in those same bores. This can be appreciated by referring to FIGS. 8-12.

While two-piece actuators 110 are illustrated, the system can alternatively have one-piece actuators. For example, the controllers can alternatively be formed by proximal ends of the push rods, and the push rods can be externally threaded and thus configured to mate with the interiorly-threaded bores of the flow block 350.

The illustrated insert assembly 10 includes two blocks 100, 350 configured to be removably mounted side-by-side in the mount opening 570 of the feedblock 500. The first block 350 is the flow block, which preferably is configured to carry the wedge-shaped flow adjuster 50 and the actuators 110. The second block 100 is the viscosity block. If desired, these two blocks can be replaced with a single block, or with more than two blocks collectively forming the desired structure.

The illustrated viscosity block 100 has a convex flow-contacting surface 165 and, when the insert assembly 10 is operably assembled, this surface 165 is exposed to the coextrusion conduit 200 and confronts the second flow-contacting surface 152 of the wedge-shaped flow adjuster 50. The second flow-contacting surface 152 of the flow adjuster 50 preferably has a concave configuration.

The flow-contacting surface 165 of the viscosity block 100 preferably is seamless over the width 235 of the coextrusion conduit 200. Thus, the viscosity block 100 preferably comprises a single integral body, which defines the flow-contacting surface 165, configured to span the width 235 of the coextrusion conduit 200. This is best shown in FIGS. 3-5.

The flow block 350 preferably has a manifold 385 that widens a flow of extrudate moving along it so as to form a sheet-like flow. In the illustrated embodiment, this manifold 385 comprises a generally V-shaped flow section. This is best shown in FIGS. 4 and 6. The manifold 385 extends from a narrow input section 384 to a wide, flat section 386 from which the extrudate emanates as a flat sheet-like flow. In the illustrated embodiment, the portion of the coextrusion channel 200 that extends through the flow block 350 comprises a conduit section 240 and a subsequent manifold 385. The insert assembly 10 is thus configured to deliver a flat sheet-like extrudate flow from the manifold 385 of the flow block 350. During use, the resulting sheet-like extrudate flow is subsequently delivered out of the insert assembly 10 so as to merge with extrudate in the central conduit 300. It is to be appreciated, however, that the flow path leading to, and past, the wedge-shaped flow adjuster 50 can have many different configurations depending on the intended application.

The illustrated insert assembly 10 also includes a seal plate 920, which is configured to be secured removably to the feedblock 500 by bolts or other removable fasteners. Reference is made to FIG. 4.

While preferred embodiments of the invention have been described, it should be understood that various changes, adaptations and modifications may be made therein without departing from the spirit of the invention and the scope of the appended claims.

What is claimed is:

1. A coextrusion feedblock having a housing, a central conduit, a coextrusion conduit, a wedge-shaped flow adjuster, and a plurality of actuators, said coextrusion conduit having a gap height, a width, and a length, said wedge-shaped flow adjuster comprising a plurality of adjustment segments positioned side-by-side along said width of said coextrusion conduit, each of said adjustment segments being independently rotatable, said actuators being operably coupled with respective adjustment segments of said wedge-shaped flow adjuster, each actuator being moveable between first and second configurations, the first configuration involving said actuator engaging the respective adjustment segment of said wedge-shaped flow adjuster to limit rotation of said adjustment segment, the second configuration involving said actuator being disengaged such that the respective adjustment segment of said wedge-shaped flow adjuster is allowed to rotate in response to mass flow variations of extrudates flowing through said central conduit and said coextrusion conduit.

2. The coextrusion feedblock of claim 1 wherein each adjustment segment of said wedge-shaped flow adjuster has more freedom to rotate when the respective actuator is in the second configuration than when it is in the first configuration.

3. The coextrusion feedblock of claim 1 wherein the first configuration involves said actuator engaging the respective adjustment segment of said wedge-shaped flow adjuster to limit rotation of said adjustment segment in a first direction without limiting rotation in an opposite, second direction, wherein rotation in the first direction involves widening said gap height of said coextrusion channel, and rotation in the second direction involves narrowing said gap height of said coextrusion channel.

4. The coextrusion feedblock of claim 1 wherein each actuator can be moved axially to rotate the respective adjustment segment of said wedge-shaped flow adjuster such that said gap height of said coextrusion conduit is narrowed.

5. The coextrusion feedblock of claim 1 wherein each adjustment segment of said wedge-shaped flow adjuster has a cam surface, and each actuator is configured to bear against said cam surface of the respective adjustment segment of said wedge-shaped flow adjuster to rotate said adjustment segment such that said gap height of said coextrusion conduit is narrowed.

6. The coextrusion feedblock of claim 1 wherein each actuator comprises a rotatable controller and a push rod that are operably coupled with each other such that said controller can be rotated to move said push rod axially to cam with the respective adjustment segment of said wedge-shaped flow adjuster.

7. The coextrusion feedblock of claim 1 wherein said actuators are accessible from outside of said coextrusion feedblock, such that said coextrusion conduit can be profiled by an operator from outside of said coextrusion feedblock without having to stop operating said coextrusion feedblock.

8. The coextrusion feedblock of claim 1 wherein said wedge-shaped flow adjuster is adjustable to profile said coextrusion conduit such that said gap height is different adjacent to different adjustment segments of said wedge-shaped flow adjuster.

9. The coextrusion feedblock of claim 1 wherein each adjustment segment of said wedge-shaped flow adjuster has first and second flow-contacting surfaces, said first flow-contacting surface being exposed to said central conduit, said second flow-contacting surface being exposed to said coextrusion conduit, and each adjustment segment of said wedge-shaped flow adjuster is rotatable to simultaneously change said gap height of said coextrusion conduit and a height of said central conduit.

10. The coextrusion feedblock of claim 1 wherein said housing has an exterior wall and a mount opening extending from said exterior wall to said central conduit, said coextrusion feedblock having a coextrusion profiling insert assembly mounted removably in said mount opening, said coextrusion profiling insert assembly comprising first and second blocks positioned side-by-side in said mount opening such that said coextrusion conduit extends between said first and second blocks, said first block carrying said wedge-shaped flow adjuster and said actuators.

11. A coextrusion profiling insert assembly configured to be mounted in a mount opening of a coextrusion feedblock having a housing, a central conduit, and a coextrusion conduit, said insert assembly having a wedge-shaped flow adjuster and a plurality of actuators, said wedge-shaped flow adjuster comprising a plurality of adjustment segments configured to be positioned side-by-side along a width of the coextrusion conduit, each of said adjustment segments being independently rotatable when said insert assembly is operably mounted in the mount opening of the coextrusion feedblock, said actuators configured to be operably coupled with respective adjustment segments of said wedge-shaped flow adjuster such that each actuator is moveable between first and second configurations, the first configuration involving said actuator engaging the respective adjustment segment of said wedge-shaped flow adjuster to limit rotation of said adjustment segment, the second configuration involving said actuator being disengaged such that the respective adjustment segment of said wedge-shaped flow adjuster is allowed to pivot in response to mass flow variations of extrudates flowing through said central conduit and said coextrusion conduit.

12. The coextrusion profiling insert assembly of claim 11 wherein each adjustment segment of said wedge-shaped flow adjuster has more freedom to rotate when the respective actuator is in the second configuration than when it is in the first configuration.

13. The coextrusion profiling insert assembly of claim 11 wherein the first configuration involves said actuator engaging the respective adjustment segment of said wedge-shaped flow adjuster to limit rotation of said adjustment segment in a first direction without limiting rotation in an opposite, second direction, wherein rotation in the first direction involves widening said gap height of said coextrusion channel, and rotation in the second direction involves narrowing said gap height of said coextrusion channel.

14. The coextrusion profiling insert assembly of claim 11 wherein each adjustment segment of said wedge-shaped flow adjuster has a cam surface, and each actuator is configured to bear against said cam surface of the respective adjustment segment of said wedge-shaped flow adjuster to rotate said adjustment segment such that a gap height of the coextrusion conduit is narrowed.

15. The coextrusion profiling insert assembly of claim 14 wherein each adjustment segment of said wedge-shaped flow adjuster has first and second flow-contacting surfaces, and said insert assembly is configured to be operably mounted in the mount opening of the coextrusion feedblock such that i) said first flow-contacting surface of each adjustment segment of said wedge-shaped flow adjuster is exposed to the central conduit, ii) said second flow-contacting surface of each adjustment segment of said wedge-shaped flow adjuster is exposed to the coextrusion conduit, and iii) each adjustment segment of said wedge-shaped flow adjuster is rotatable to simultaneously change a gap height of the coextrusion conduit and a height of the central conduit.

16. The coextrusion profiling insert assembly of claim 15 wherein each adjustment segment of said wedge-shaped flow adjuster has a generally cylindrical base region and a tip, said generally cylindrical base region having a recess to which said cam surface is exposed, said first and second flow-contacting surfaces converging toward each other with increasing distance from said generally cylindrical base region until reaching said tip.

17. The coextrusion profiling insert assembly of claim 11 wherein said actuators are configured to be operably coupled with respective adjustment segments of said wedge-shaped flow adjuster such that a first of said actuators is moveable axially to push a first of said adjustment segments of said wedge-shaped flow adjuster, thereby narrowing a gap height of the coextrusion conduit adjacent to said first of said adjustment segments, and such that a second of said actuators is moveable axially to push a second of said adjustment segments of said wedge-shaped flow adjuster, thereby narrowing a gap height of the coextrusion conduit adjacent to said second of said adjustment segments.

18. The coextrusion profiling insert assembly of claim 17 wherein each actuator comprises a rotatable controller and a push rod configured to be operably coupled with each other such that said controller can be rotated to move said push rod axially to cam with the respective adjustment segment of said wedge-shaped flow adjuster.

19. The coextrusion profiling insert assembly of claim 11 wherein said insert assembly is configured to be operably mounted in the mount opening of the coextrusion feedblock such that: i) said actuators are accessible from outside of the coextrusion feedblock, thereby allowing the coextrusion conduit to be profiled by an operator from outside of the coextrusion feedblock without having to stop operating the coextrusion feedblock, and ii) said wedge-shaped flow adjuster is adjustable to profile the coextrusion conduit by making a gap height of the coextrusion conduit different adjacent to different adjustment segments of said wedge-shaped flow adjuster.

20. The coextrusion profiling insert assembly of claim 11 comprising first and second blocks configured to be removably mounted side-by-side in the mount opening of the coextrusion feedblock such that the coextrusion conduit extends between said first and second blocks, said first block carrying said wedge-shaped flow adjuster and said actuators.

* * * * *